United States Patent [19]

Sakai

[11] Patent Number: 5,609,551
[45] Date of Patent: Mar. 11, 1997

[54] LOCKUP CONTROL SYSTEM FOR TORQUE CONVERTER

[75] Inventor: Hiromasa Sakai, Yokosuka, Japan

[73] Assignee: Nissan Motor Co., Ltd., Yokohama, Japan

[21] Appl. No.: 570,887

[22] Filed: Dec. 12, 1995

[30]   Foreign Application Priority Data

Dec. 12, 1994   [JP]   Japan ................................. 6-307420

[51] Int. Cl.$^6$ ................................. B60K 41/02
[52] U.S. Cl. ............................ 477/168; 477/171
[58] Field of Search ................................. 477/168, 171

[56]          References Cited

FOREIGN PATENT DOCUMENTS 2-35266   2/1990   Japan .

OTHER PUBLICATIONS

"Service Manual for Nissan RE4R01A-Type Full-Range Electronically-Controlled Automatic Transmission" issued by Nissan Motor Co., Ltd. (1987).

*Primary Examiner*—Dirk Wright
*Attorney, Agent, or Firm*—Foley & Lardner

[57]          ABSTRACT

An improved lockup control system for a lockup-type torque converter including a lockup clutch performs a lockup releasing control of the lockup clutch with a satisfactory response characteristic at any input torque of the torque converter without causing a lockup releasing shock. The control system includes a controller which is operative when the driving condition of a vehicle as represented by the throttle valve opening and the vehicle speed is judged to belong to a lockup releasing region, to reduce the differential pressure across the lockup clutch for disengaging the lockup clutch and thereby releasing the lockup. On such occasion, in the first place, the differential pressure is set to an initial differential pressure immediately before the lockup clutch begins to slip, depending upon the input torque of the torque converter at the instant of the lockup releasing command. Subsequently, the differential pressure is gradually reduced from the initial differential pressure to become zero after the lapse of a predetermined time.

5 Claims, 8 Drawing Sheets

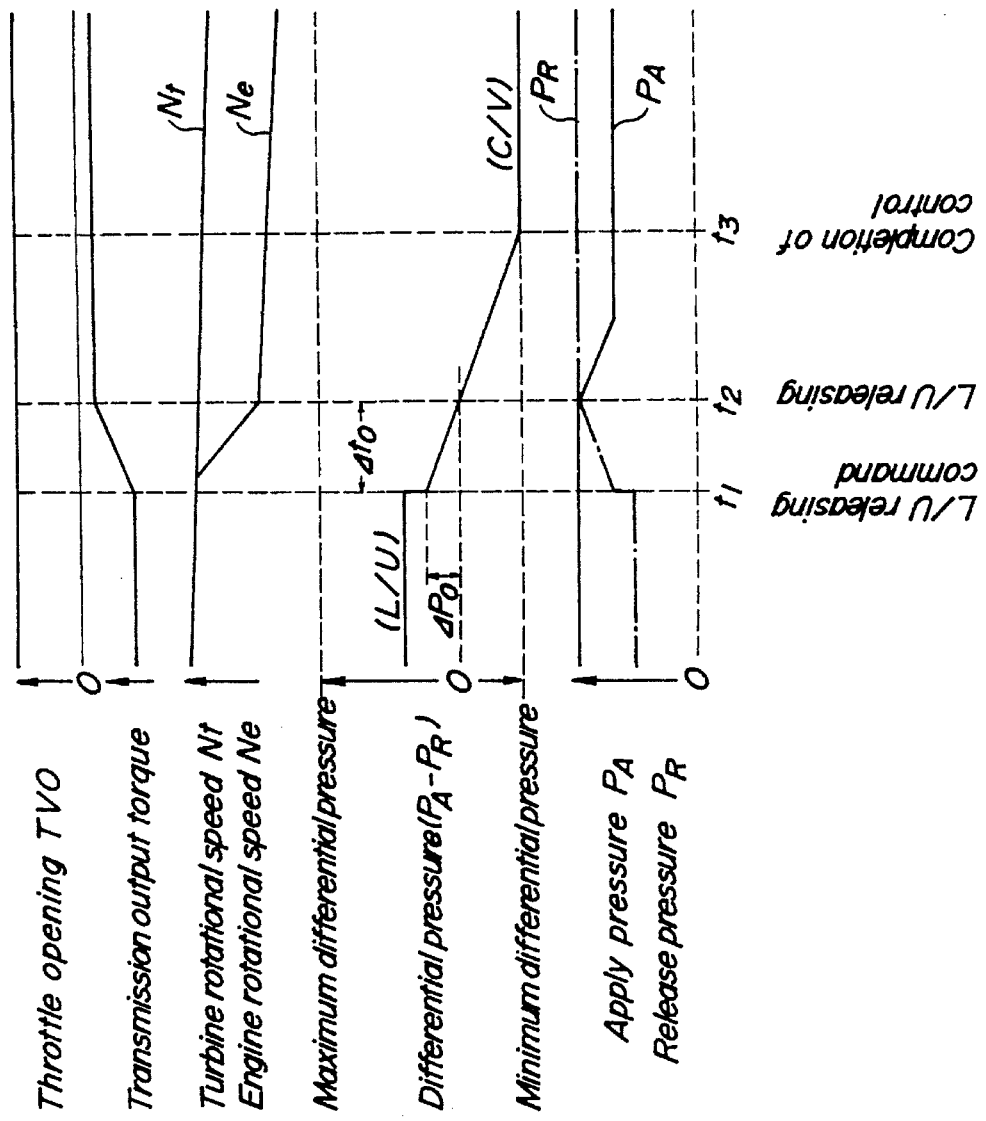

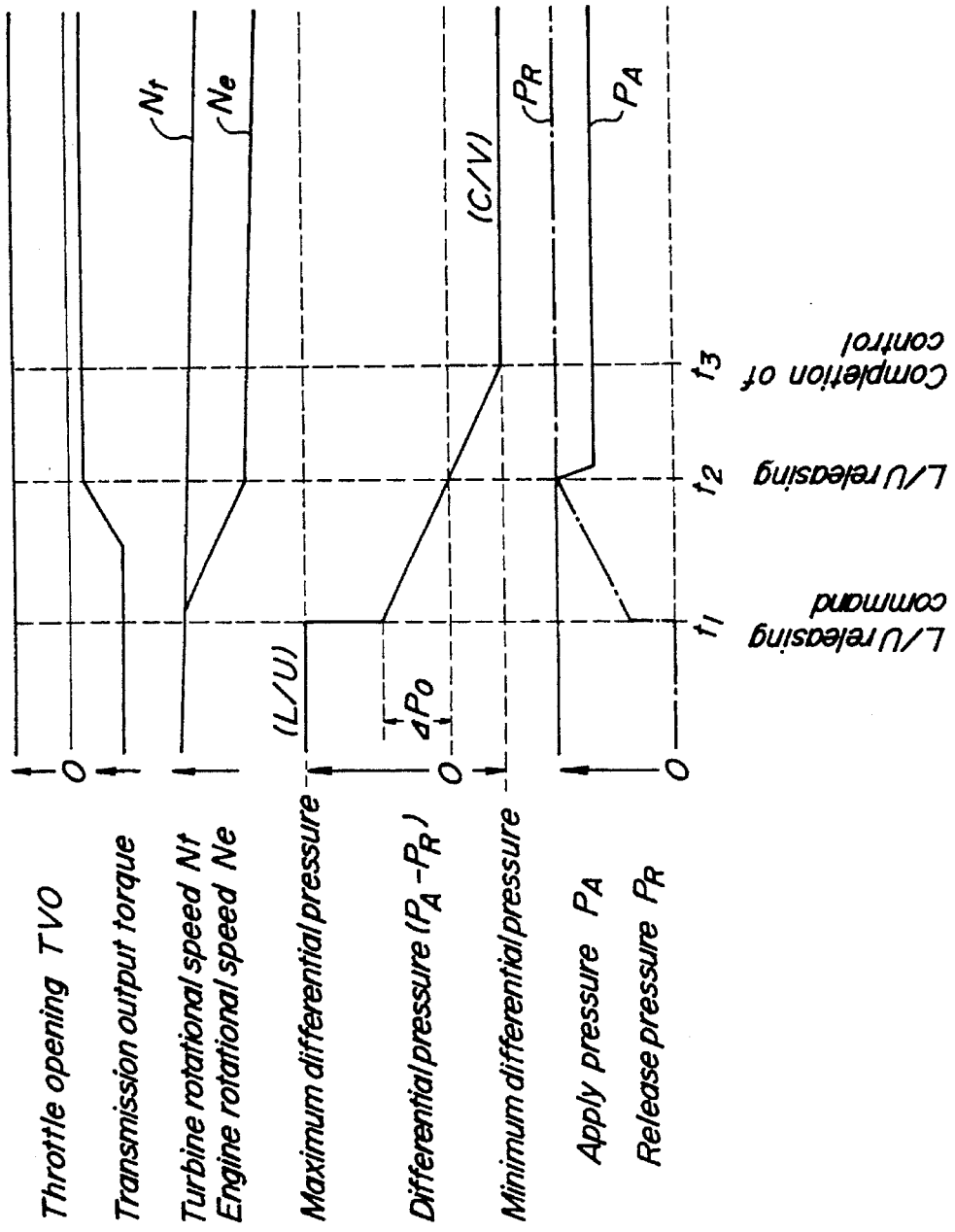

LOCKUP CONTROL SYSTEM FOR TORQUE CONVERTER

BACKGROUND OF THE INVENTION

1. Field of the Invention

The present invention relates generally to a torque converter used for an automatic transmission or the like. More particularly, it pertains to a lockup control system which properly performs a lockup releasing control when effecting changeover from a lockup mode in which input and output elements of the torque converter are directly coupled to each other, to a converter mode in which the direct coupling between the input and output elements is released.

2. Description of the Related Art

Generally, automatic transmission inclusive of continuously variable transmission comprises a torque converter on its input side, to achieve torque multiplication or absorb torque fluctuation. As generally known in the art, ordinary torque converter suffers from a low power transmission efficiency because power is transmitted from the input element to the output element via a working fluid in the converter. Thus, it is a recent trend to employ a lockup-type torque converter comprising a lockup clutch which is capable of directly coupling the input and output elements when torque multiplication function and/or torque fluctuation absorption function are not required.

The above-mentioned lockup clutch for directly coupling the input and output elements is engaged by a differential pressure across the clutch, and disengaged to release the direct coupling or lockup as the differential pressure is reduced. In order to minimize a shock upon releasing the lockup, Japanese Patent Application Laid-Open Publication No. 2-35,266 discloses a technology wherein the differential pressure across the lockup clutch is reduced at a predetermined variation rate depending upon a selected speed range of the automatic transmission.

With such a conventional lockup releasing technology, however, not only does the operation give somewhat unnatural feel in that the time required for the lockup releasing becomes different depending upon the speed range of the transmission, but also there arises a problem as follows. That is to say, when achieving a lockup state by engaging the lockup clutch and thereby directly coupling the input and output elements to each other, it has been a conventional practice from the viewpoint of facilitating the control to maximize the differential pressure across the lockup clutch, without performing a pressure control. This means that, for releasing the lockup, the differential pressure has to be gradually reduced at the above-mentioned predetermined variation rate from the maximum differential pressure. In this instance, the reduction of the differential pressure at the predetermined rate is performed even in a pressure rage from the maximum differential pressure to a certain pressure level which is not relevant to the lockup releasing shock, thereby unnecessarily prolonging the time required for releasing the lockup.

In view of such a problem, there has been proposed an improved lockup releasing control technology which is actually employed in A32-type passenger cars manufactured and sold as from 1994 under the trade name "Nissan Maxima" by Nissan Motor Co., Ltd., the assignee of this application, and which will be explained below with reference to FIG. 9. This technology is featured by a unique reduction control of the differential pressure $P_A$–$P_R$ between the torque converter apply pressure $P_A$ and a torque converter release pressure $P_R$ on opposite sides of the lockup clutch. More particularly, as shown in FIG. 9, the differential pressure $P_A$–$P_R$ is instantaneously reduced at the instant $t_1$ of the lockup releasing command from the maximum differential pressure to a certain initial differential pressure $\Delta P_0$ which is not relevant to the lockup releasing shock, and is then gradually reduced at a constant variation rate to the minimum differential pressure. With such a reduction control, the lockup clutch is disengaged and the lockup is released at the instant $t_2$ when the differential pressure $P_A$–$P_R$ becomes zero, and the control is completed at the instant $t_3$ when the differential pressure $P_A$–$P_R$ reaches the minimum differential pressure.

The above-mentioned lockup releasing control technology which is actually employed in "Nissan Maxima" proved to be highly advantageous for shortening the time required for releasing the lockup, though it would be still desirous to further improve the technology by refining the control function.

DISCLOSURE OF THE INVENTION

It is a general object of the present invention to further refine the above-mentioned lockup releasing control technology.

As a result of thorough review in an effort to achieve the general object, the applicant came to recognize that determination of the initial differential pressure $\Delta P_0$ plays an important role in refining the control function of the above-mentioned lockup releasing control technology. Specifically, the above-mentioned lockup releasing control technology makes use of a constant initial differential pressure $\Delta P_0$ which has to be determined at a relatively high level in order to avoid a lockup releasing shock while preventing the lockup clutch from slipping under any driving condition. This may give rise to occurrence of a response delay in the lockup releasing control due to an excessive initial differential pressure $\Delta P_0$, under a driving condition in which slipping of the lockup clutch is not likely to occur or the transmission torque of the torque converter is low.

With such a recognition in view, it is a specific object of the present invention to eliminate the above-mentioned problem associated with the response delay in the lockup releasing control, by properly controlling the initial differential pressure.

It should be noted in this connection that, even when there is used an initial differential pressure which is subjected to a proper control and is thus not constant, a mere application of such initial differential pressure to the above-mentioned lockup releasing control, wherein the differential pressure across the lockup clutch is reduced from the initial differential pressure to the minimum differential pressure at a constant variation rate, would not necessarily equalize the time required for releasing the lockup clutch.

Therefore, it is a more specific object of the present invention to properly control the initial differential pressure while equalizing the time required for releasing the lockup clutch to provide a further improved natural feel.

The present invention provides an improved lockup control system for a torque converter including an input element, an output element and a lockup clutch, and being operative selectively in a converter mode in which rotation of the input element is transferred to the output element via a working fluid within the torque converter, and in a lockup mode in which the lockup clutch is engaged by a differential pressure across the clutch for directly coupling the input and output elements.

The lockup control system according to the present invention comprises (A) lockup releasing command detecting means for detecting a lockup releasing command signal for releasing the direct coupling of the input and output elements, (B) input torque detecting means for determining a torque converter input torque when the lockup releasing command signal is detected, (C) initial differential pressure setting means for setting the differential pressure across the lockup clutch upon detection of the lockup releasing command signal, so as to be an initial differential pressure which corresponds to the torque converter input torque when the lockup releasing command is detected, and (D) differential pressure gradual reduction means for gradually reducing the differential pressure across the lockup clutch from the initial differential pressure to zero, for a predetermined duration from the detection of the lockup releasing command signal.

With the lockup control system according to the present invention, the torque converter serves normally to transmit the rotation of the input element to the output element via a working fluid within the converter, and assumes a lockup state when the lockup clutch is engaged by the differential pressure across the clutch, so as to directly couple the input and output elements of the torque converter with each other, in a conventional manner. Furthermore, according to the present invention, the lockup releasing control for releasing the direct coupling of the input and output elements is performed in the following manner.

That is to say, when the lockup releasing command signal is supplied, it is detected by the lockup releasing command detecting means. The input torque detecting means is responsive to a signal from the lockup releasing command detecting means, and determines a torque converter input torque at the instant when the lockup releasing command signal has been detected. On the other hand, the initial differential pressure setting means serves to set the differential pressure across the lockup clutch upon detection of the lockup releasing command signal, so as to be an initial differential pressure which corresponds to the torque converter input torque at the instant when the lockup releasing command has been detected. Furthermore, the differential pressure gradual reduction means serves to gradually reduce the differential pressure across the lockup clutch from the initial differential pressure to zero, for a predetermined duration from the detection of the lockup releasing command signal.

According to the present invention, the differential pressure across the lockup clutch upon lockup releasing control is set to be an initial differential pressure which corresponds to the torque converter input torque at the instant when the lockup releasing command has been detected. Thus, it is possible to perform a lockup releasing control so as to provide an improved response characteristic of the control within such a range in which occurrence of lockup releasing shock can be positively prevented regardless of the transfer torque of the torque converter or of the driving condition of the vehicle, thereby eliminating the problem associated with the response delay in the conventional lockup releasing control.

Furthermore, in the subsequent lockup releasing control according to the present invention, the differential pressure across the lockup clutch is gradually reduced from the initial differential pressure to zero, for a predetermined duration from the detection of the lockup releasing command signal, so as to complete the control. Thus, even though the initial differential pressure is changed depending upon the input torque of the torque converter, as mentioned above, it is possible to maintain constant the time required for releasing the lockup. This serves to eliminate the problem of the prior art wherein the time required for releasing the lockup changes depending upon the selected speed range.

According to an advantageous embodiment of the present invention, the input torque detecting means detects the torque converter input torque based on a throttle opening of an engine which is arranged on the input side of the torque converter. In this instance, the above-mentioned advantageous function of the invention can be achieved in a less expensive manner, without requiring an elaborate torque detection.

According to another advantageous embodiment of the present invention, the initial differential pressure setting means sets the differential pressure across the lockup clutch upon detection of the lockup releasing command signal, so as to be an initial differential pressure immediately before the lockup clutch begins to slip. In this instance, it is possible to improve the response characteristic of the lockup releasing control as far as possible within a range in which occurrence of lockup releasing shock can be prevented regardless of the transfer torque of the torque converter or of the driving condition of the vehicle, to further positively achieve the above-mentioned advantageous function of the invention.

According to still another advantageous embodiment of the present invention, the differential pressure gradual reduction means gradually reduces the differential pressure across the lockup clutch from the initial differential pressure to zero, at a constant variation rate with time. In this instance, the lockup releasing control is advanced at a same rate during the entire period of the lockup releasing control, to thereby more positively mitigate or eliminate the lockup releasing shock.

According to still another advantageous embodiment of the present invention, the control system further comprises braking detecting means for detecting a braking condition of a vehicle, and a differential pressure instantaneous reduction means responsive to the braking detecting means, for stopping the operation of the differential pressure gradual reducing means and instantaneously reducing the differential pressure across the lockup clutch. In this instance, even when a braking lock of the wheel occurs during the operation of the differential pressure gradual reducing means, it is possible to avoid an engine stalling due to the delay in the lockup releasing, thereby enhancing practical advantages of the invention.

BRIEF DESCRIPTION OF THE DRAWINGS

The present invention will now be explained in further detail hereinafter, with reference to a specific embodiment shown in the accompanying drawings, in which:

FIG. 8 is an operational time chart of the lockup releasing control performed by the system of FIG. 2; and FIG. 9 is a similar operational time chart of the lockup releasing control performed by the above-mentioned conventional system.

DESCRIPTION OF THE PREFERRED EMBODIMENTS

Figure 1:
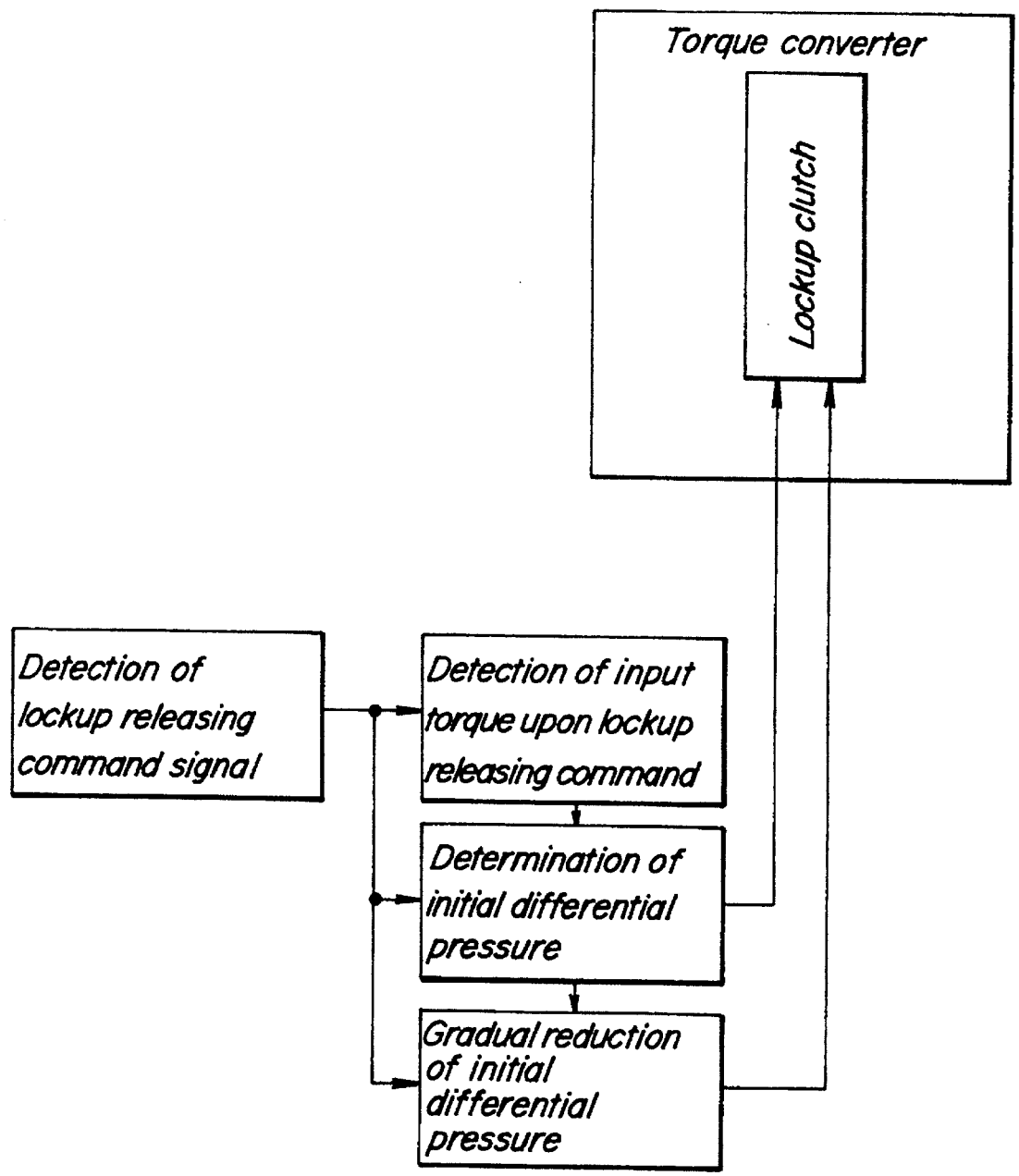
FIG. 1 is a schematic view showing the general concept of the present invention.

Referring now to FIG. 1, which shows the general invention concept as explained above, the lockup control system according to the present invention is applied to a torque converter of an automatic transmission including a an input element, an output element and a lockup clutch. The torque converter is operative selectively in a converter mode in which rotation of the input element is transferred to the output element via a working fluid within the torque converter, and in a lockup mode in which the lockup clutch is engaged by a differential pressure across the clutch for directly coupling the input and output elements. Such a torque converter is known, per se.

Generally stated, as shown in FIG. 1, the lockup control system according to the present invention includes a lockup releasing command detecting means which serves to detect a lockup releasing command for releasing the direct coupling of the input and output elements. An input torque detecting means serves to determine a torque converter input torque when the lockup releasing command signal is detected. An initial differential pressure setting means serves to set the differential pressure across the lockup clutch upon detection of the lockup releasing command signal, so as to be an initial differential pressure which corresponds to the torque converter input torque when the lockup releasing command signal is detected. Finally, a differential pressure gradual reduction means serves to gradually reduce the differential pressure across the lockup clutch from the initial differential pressure to zero, for a predetermined duration from detection of the lockup releasing command signal.

Figure 2:
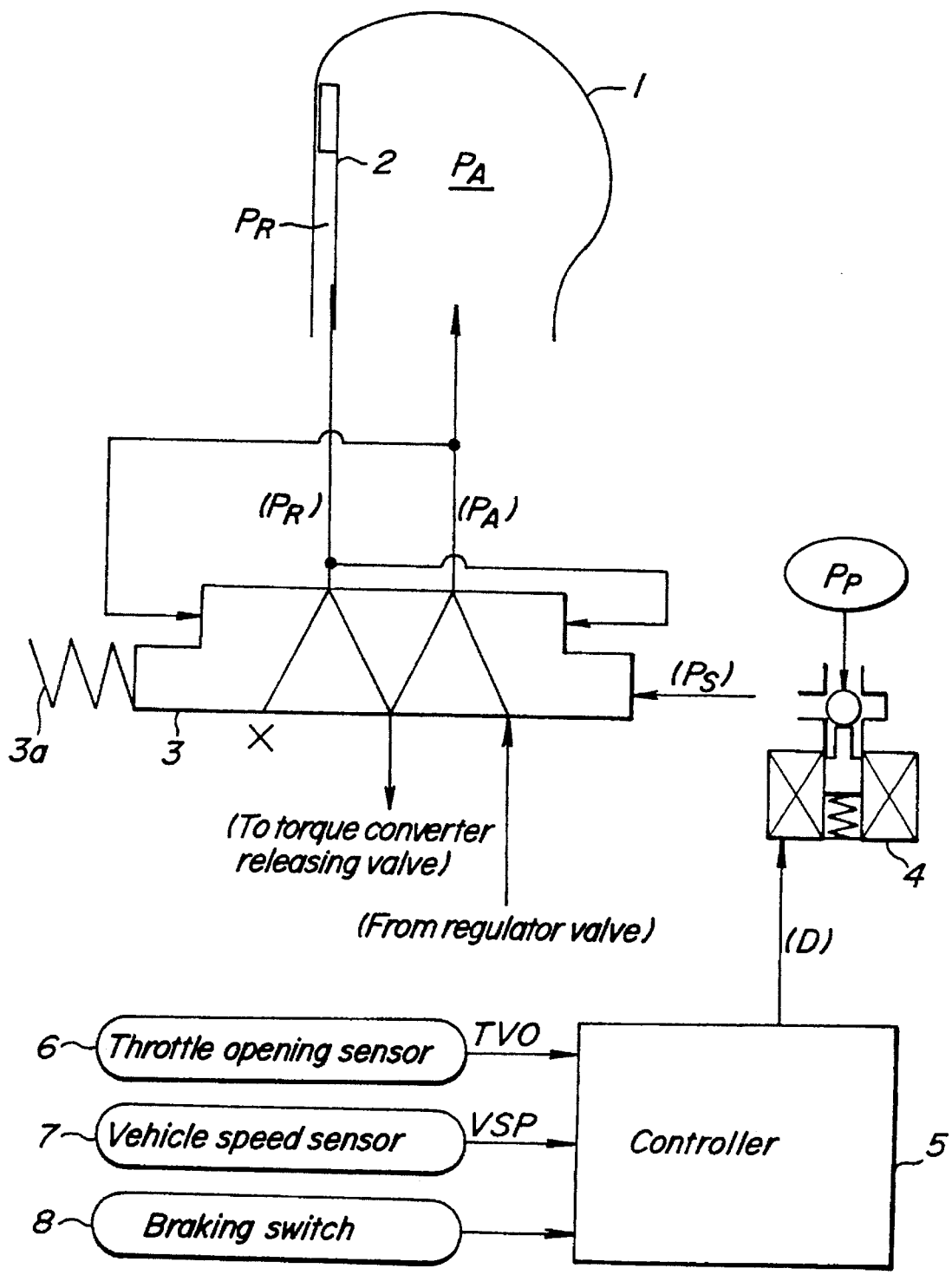
FIG. 2 is a schematic view showing one embodiment of the lockup releasing control system for a torque converter according to the present invention.

With reference to FIG. 2, which shows one preferred embodiment of the lockup releasing control system according to the present invention, reference numeral 1 denotes a torque converter which is interposed in a power transmission path of an automatic transmission which may be a continuously variable transmission. It may be assumed that the torque converter 1 is a lockup-type converter which is described in "Service Manual for RE401A-type Automatic Transmission" (A261C07) issued by Nissan Motor Co., Ltd., in 1987, the disclosure of which is herein incorporated by reference. In this instance, the torque converter 1 serves to normally transmit power between the input and output elements via a working fluid within the converter. The torque converter 1 includes a lockup clutch 2 incorporated therein, which is rotatable with the output element. The lockup clutch 2 can be engaged with the input element to achieve a lockup state of the torque converter 1 in which the input and output elements are directly coupled to each other.

The lockup clutch 2 is responsive to a differential pressure $P_A - P_R$ between the torque converter apply pressure $P_A$ and the torque converter release pressure $P_R$ which are applied on opposite sides of the lockup clutch 2. More particularly, during the period in which the release pressure $P_R$ is higher than the apply pressure $P_A$, the lockup clutch 2 is maintained in a disengaged state without achieving a direct coupling of the input and output elements. Conversely, when the release pressure $P_R$ becomes lower than the apply pressure $P_A$, the lockup clutch 2 is engaged to achieve a direct coupling of the input and output elements. In the latter case in which the lockup clutch 2 is engaged, the lockup capacity of the lockup clutch 2 is determined by the differential pressure $P_A - P_R$ such that a greater differential pressure results in increased lockup capacity of the lockup clutch 2. The disengagement of the lockup clutch is achieved when the differential pressure $P_A - P_R$ is reduced to be lower than zero.

Figure 3:
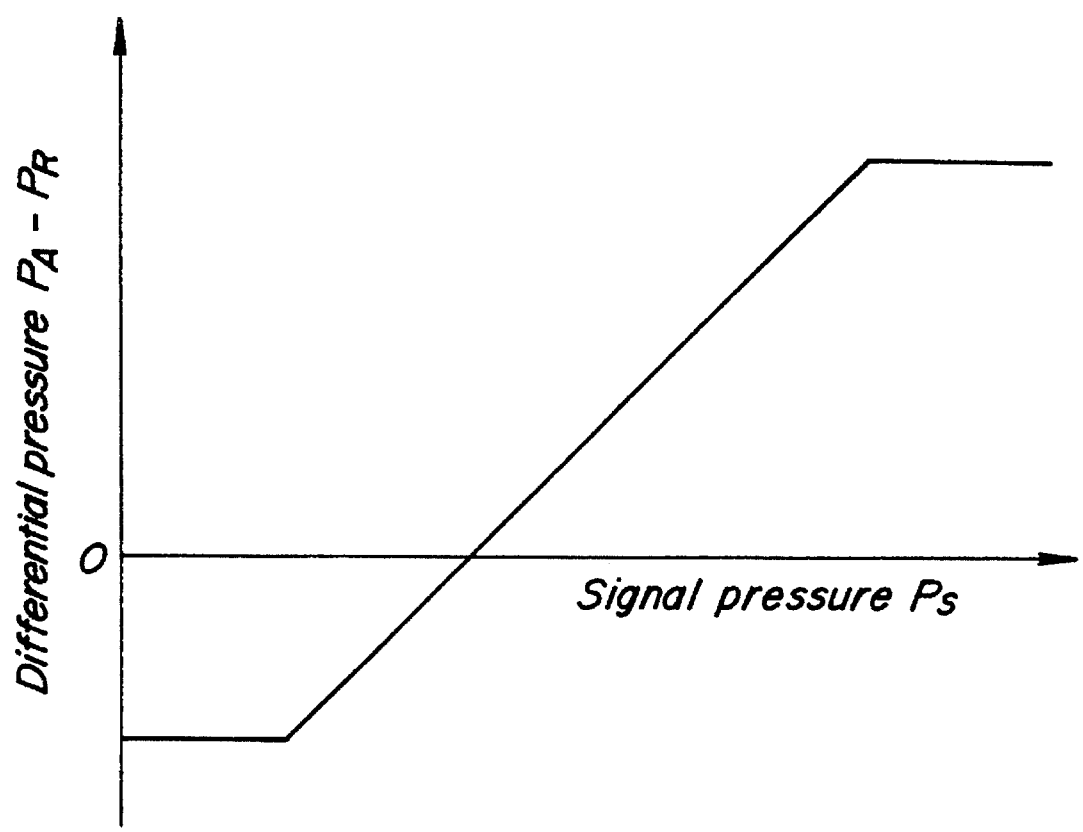
FIG. 3 is a graph showing the operational characteristic of the lockup control valve in the system of FIG. 2.

The differential pressure $P_A - P_R$ is controlled by a lockup control valve 3 which is known, per se. The lockup control valve 3 is applied by the apply pressure $P_A$ and the release pressure $P_R$ in opposite directions. The lockup control valve 3 is further applied by a spring force of a spring 3a in the same direction as the apply pressure $P_A$, and by a signal pressure $P_S$ in the same direction as the release pressure $P_R$. The lockup control valve 3 determines the differential pressure $P_A - P_R$ so that these forces are brought into equilibrium with each other. In this connection, it may be assumed that the differential pressure $P_A - P_R$ changes with a characteristic such as that shown in FIG. 3, depending upon the signal pressure $P_S$.

The signal pressure $P_S$ is generated on the basis of a pump pressure $P_p$, by a lockup solenoid 4 in accordance with a lockup duty D, and the duty D for the lockup solenoid 4 is electronically controlled by a controller 5. The controller 5, in turn, is supplied with a signal from a throttle valve opening sensor 5 for detecting the throttle valve opening TVO of an engine (not shown) which is connected to the input side of the torque converter 1, a signal from a vehicle speed sensor 7 for detecting the vehicle speed VSP, and a signal from a braking switch 8 which is turned ON when the braking pedal of the vehicle is depressed.

Figure 4:
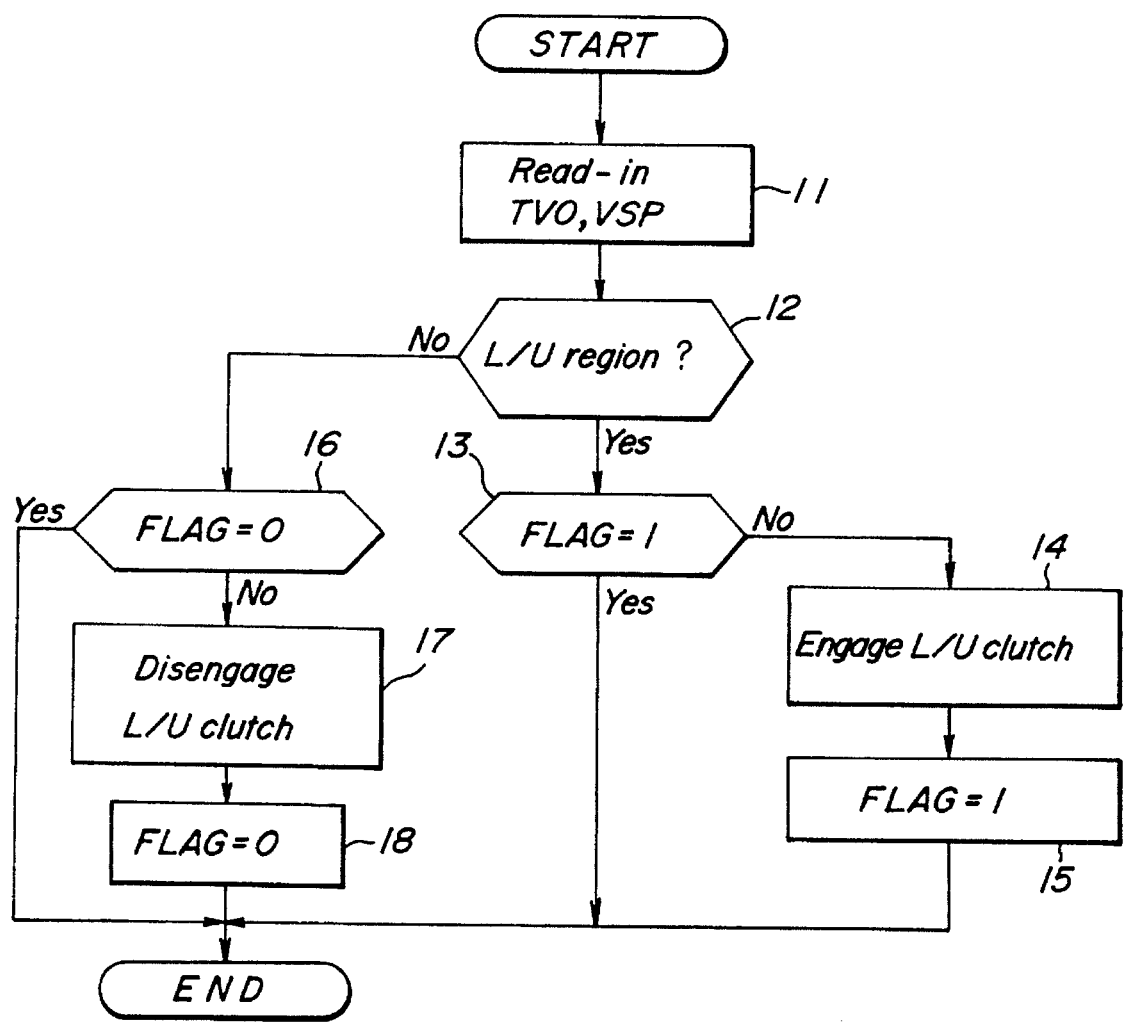
FIG. 4 is a flow chart showing the main routine of a lockup control program executed by the controller in the system of FIG. 2.
Figure 5:
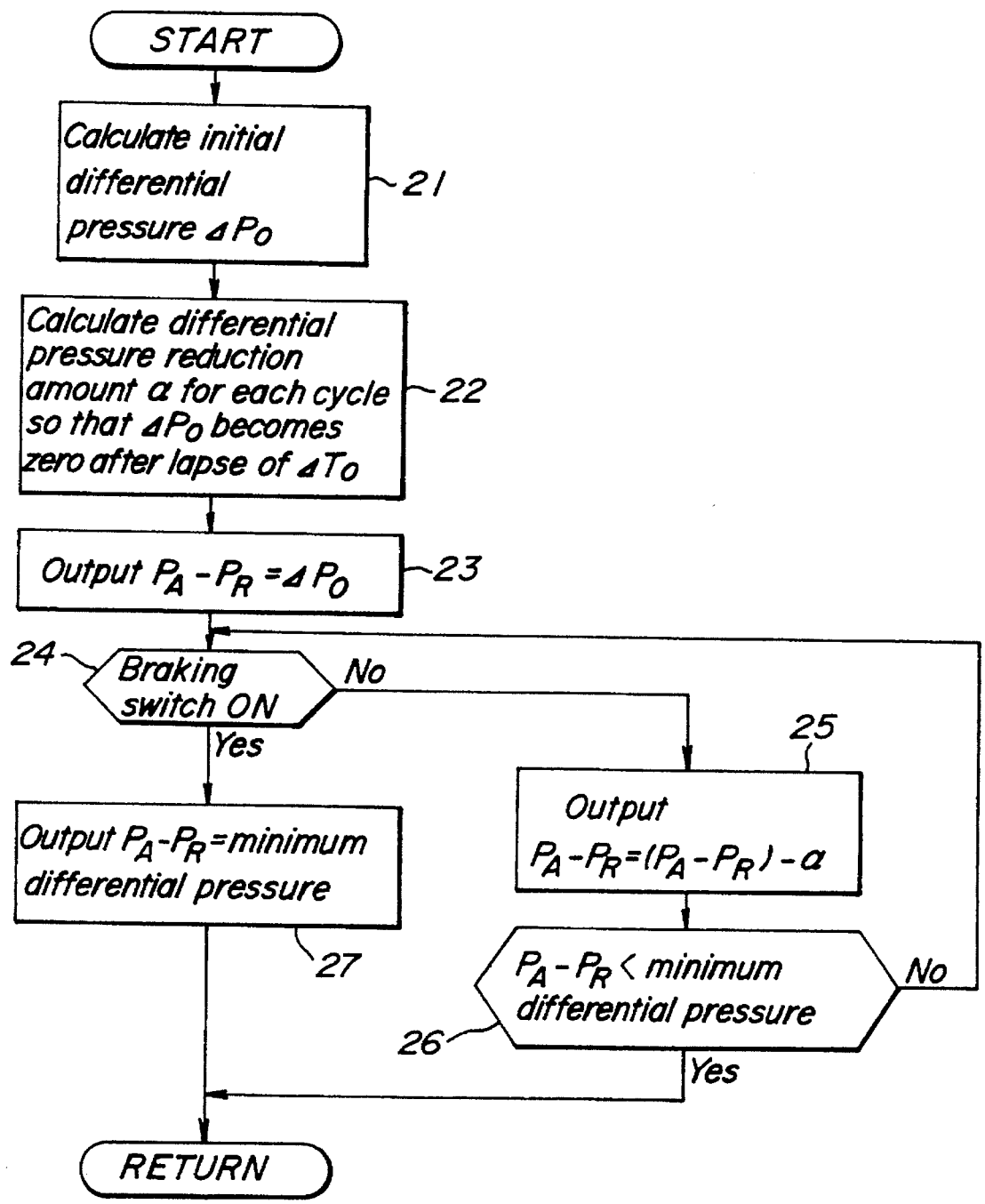
FIG. 5 is a flow chart showing the sub-routine of the lockup control program.

Based on these input information, the controller 5 executes the control program shown in FIGS. 4 and 5, to perform a duty control of the lockup solenoid 4 and thereby achieve a lockup control of the torque converter 1. More particularly, in the initial step 11 in FIG. 4, the throttle valve opening TVO and the vehicle speed VSP are read-in. Then, in a subsequent step 12 which corresponds to the lockup releasing command detecting means, a judgement is made as to whether the current driving condition belongs to a lockup region in which the torque converter is to be locked-up, or to a converter region in which the torque converter 1 is to be maintained in the converter mode, based on the combination of the throttle valve opening TVO and the vehicle speed VSP.

If it is judged that the current driving condition belongs to a lockup region, the control advances to a subsequent step 13 where a determination is made as to whether the torque converter 1 is already in a lockup state, based on whether or not the flag FLAG is 1. If it is judged that the torque converter 1 is already in the lockup state, the control is terminated and the lockup mode is maintained. Conversely, if it is judged that the torque converter 1 is not yet in the lockup state, the control advances to a subsequent step 14 where a command is issued to engage the lockup clutch 2 and the duty D for the lockup solenoid 4 is determined so as to achieve the command. In this instance, through a corresponding signal pressure $P_S$ and via the lockup control valve 3, the lockup solenoid 4 increases the differential pressure $P_A - P_R$ to achieve an engagement of the lockup clutch 2, thereby to switch the torque converter 1 into a lockup state.

The control then advances to a subsequent step 15 where the flag FLAG is set to 1, so as to indicate the lockup state.

In the step 12 in FIG. 4, if it is judged that the current driving condition belongs to a converter region, the control advances to a subsequent step 16 where a determination is made as to whether the torque converter 1 is already in a converter state, based on whether or not the flag FLAG is 0. If it is judged that the torque converter 1 is already in the converter state, the control is terminated and the converter state is maintained. Conversely, if it is judged that the torque converter 1 is not yet in the converter state, the control advances to a subsequent step 17 where a command is issued to disengage the lockup clutch 2 and the duty D for the lockup solenoid 4 is determined so as to achieve the command, in a manner which will be more specifically explained below. In this instance, through a corresponding signal pressure $P_S$ and via the lockup control valve 3, the lockup solenoid 4 decreases the differential pressure $P_A-P_R$ to achieve a disengagement of the lockup clutch 2, thereby to switch the torque converter 1 into a converter state. The control then advances to a subsequent step 18 where the flag FLAG is reset to 0, so as to indicate the converter state.

Figure 6:
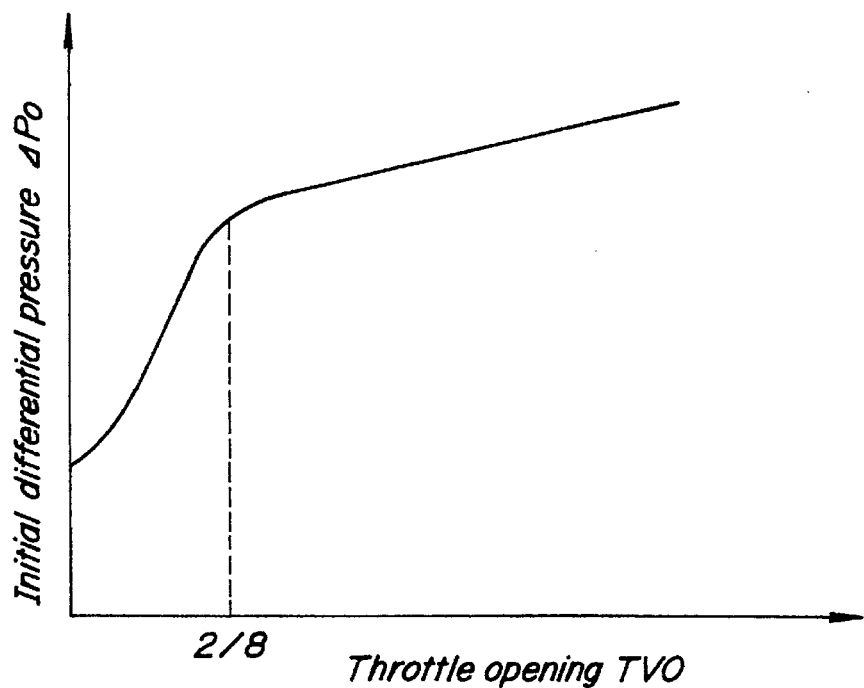
FIG. 6 is a graph showing one example of the characteristic of the initial differential pressure.
Figure 7:
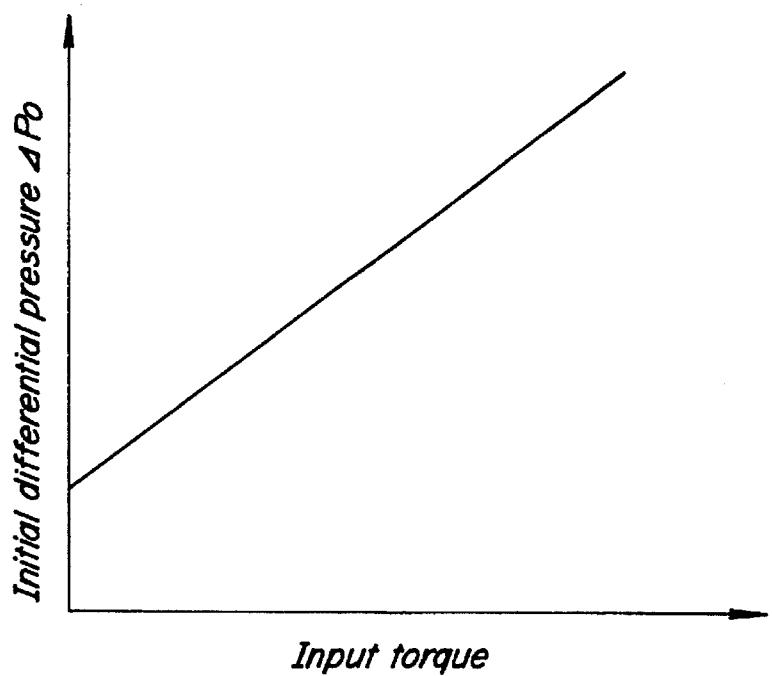
FIG. 7 is a graph showing another example of the characteristic of the initial differential pressure.

Now, as regards the lockup releasing control to be performed by disengaging the lockup clutch 2 at the step 17, the control may be such as that shown in FIG. 5. In the initial step 21 in FIG. 5, the initial value $\Delta P_0$ of the differential pressure $P_A-P_R$, i.e., initial differential pressure, is calculated based on a map shown in FIG. 6 and depending upon the throttle valve opening TVO. In this connection, the initial differential pressure $\Delta P_0$ is set to be a differential pressure at the instant $t_1$ of the lockup releasing command, immediately before a slipping of the lockup clutch 2 occurs, and is determined by the transfer torque or the input torque of the torque converter. It is assumed in the illustrated embodiment that the transfer torque or the input torque of the torque converter is presumed from the throttle valve opening TVO as shown in FIG. 6, and the initial differential pressure $\Delta P_0$ is stored as a map with reference to the throttle valve opening TVO. Such an arrangement is particularly advantageous in that the system can be realized in a less costly manner, since it becomes unnecessary to perform a difficult detection of the transfer torque of the torque converter.

As an alternative possibility, the initial differential pressure $\Delta P_0$ may be stored as a map with reference to the input torque of the torque converter upon generation of the lockup releasing command. In this instance, the input torque of the torque converter may be calculated with a conventional method using characteristic curves of the torque converter, to determine the initial differential pressure $\Delta P_0$ by retrieving the map based on the input torque of the torque converter calculated as above.

In a subsequent step 22, a differential pressure reduction amount α for each calculating cycle is determined so that the lockup is released at the instant $t_2$ when a predetermined time $\Delta T_O$ has lapsed from the instant $t_1$ of the lockup releasing command. In other words, the differential pressure reduction amount α for each calculating cycle is determined so that the initial differential pressure $\Delta P_O$ becomes zero at the instant $t_2$ after the lapse of time $\Delta T_O$.

In a subsequent step 23, a command is generated so that the differential pressure $P_A-P_R$ becomes the initial differential pressure $\Delta P_O$, and a duty D for the lockup solenoid 4 is determined to achieve the command. In this instance, through a signal pressure $P_S$ and via the lockup control valve 3, the lockup solenoid 4 causes the differential pressure $P_A-P_R$ to be instantaneously lowered to the initial differential pressure $\Delta P_O$, at the instant $t_1$ of the lockup releasing command as shown in FIG. 8. Thus, the steps 21 and 23 in FIG. 5 correspond to the input torque detecting means and the initial differential pressure setting means, respectively.

The control then advances to a subsequent step 24 which corresponds to the braking detecting means. Thus, a determination is made at the step 24, as to whether the vehicle is under a braking state with the braking switch 8 turned ON. If the vehicle is not under a braking state, the control advances to subsequent steps 25, 26 where the differential pressure $P_A-P_R$ is gradually reduced at a rate corresponding to the above-mentioned reduction amount α, for the duration up to the instant $t_3$ when the differential pressure $P_A-P_R$ becomes the minimum differential pressure and the lockup releasing control is completed. Thus, the steps 22 and 25 correspond to the differential pressure gradual reduction means.

According to the illustrated embodiment of the present invention, the lockup clutch 2 is disengaged and the lockup releasing control of the torque converter is achieved, based on the above-mentioned initial setting and gradual reduction of the differential pressure $P_A-P_R$. Upon such lockup releasing control of the torque converter, at the instant $t_1$ of the lockup releasing command, the differential pressure $P_A-P_R$ across the lockup clutch 2 is set to be the initial differential pressure $\Delta P_O$ which is at the pressure level immediately before the lockup clutch 2 begins to slip, as determined from the input torque of the torque converter. Therefore, it is possible positively to provide as critically improved response characteristic of the lockup releasing control as possible, within a range in which occurrence of lockup releasing control can be avoided at any input torque of the torque converter.

Furthermore, during a subsequent lockup releasing control of the torque converter, the differential pressure $P_A-P_R$ across the lockup clutch 2 is reduced from the initial differential pressure $\Delta P_O$ by an amount α for each calculation cycle, and such reduction is continued until the control is completed, in such a manner that the differential pressure $P_A-P_R$ becomes zero and the lockup is released at the instant $t_2$ when a predetermined time $\Delta t_0$ has lapsed from the instant $t_1$ of the lockup releasing command. Therefore, even though the initial differential pressure $\Delta P_O$ changes depending upon the input torque of the torque converter at the instant $t_1$ of the lockup releasing command as mentioned above, it is possible to maintain constant the time required for the lockup releasing.

Incidentally, when it has been judged at the step 24 in FIG. 5 that the vehicle is under a braking state, the control advances to a subsequent step 27 which corresponds to the differential pressure instantaneous reduction means, where the control is completed by generating a command for instantaneously reducing the differential pressure $P_A-P_R$ across the lockup clutch 2 to the minimum differential pressure, and determines such a duty D for the solenoid 4 as to achieve the command. On such occasion, through a corresponding signal pressure $P_S$ and via the lockup control valve 3, the solenoid 4 causes the differential pressure $P_A-P_R$ across the lockup clutch 2 to be instantaneously reduced to the minimum differential pressure, so as to instantaneously release the lockup of the torque converter 1.

This is because if the lockup releasing were performed gradually despite a braking state of the vehicle, the engine would undergo a stalling upon occurrence of a braking lock of the wheels due to a delay in the lockup releasing control.

On the contrary, as in the illustrated embodiment, when the differential pressure $P_A$–$P_R$ across the lockup clutch 2 during a braking state of the vehicle is instantaneously reduced to the minimum differential pressure so as to instantaneously release the lockup of the torque converter 1, it is possible positively to prevent occurrence of engine stalling even when a braking lock of the wheels occurs, to further enhance the practical advantages of the invention.

It will be appreciated from the foregoing detailed description that the present invention provides a refined lockup releasing control technology which serves to eliminate the problems of the prior art associated with the response delay in the lockup releasing control, by properly controlling the initial differential pressure while equalizing the time required for releasing the lockup clutch to provide a further improved natural feel.

While the present invention has been explained with reference to a specific embodiment, such a particular disclosure has been presented by way of example only, and various modifications and/or alteration may be made without departing from the scope of the invention as defined by the appended claims.

I claim:

1. A lockup control system for a torque converter including an input element, an output element and a lockup clutch, and being operative selectively in a converter mode in which rotation of the input element is transferred to the output element via a working fluid within the torque converter, and in a lockup mode in which the lockup clutch is engaged by a differential pressure across the clutch for directly coupling the input and output elements, wherein said control system comprises:

lockup releasing command detecting means for detecting a lockup releasing command for releasing the direct coupling of the input and output elements;

input torque detecting means for determining a torque converter input torque when said lockup releasing command signal is detected;

initial differential pressure setting means for setting the differential pressure across the lockup clutch upon detection of said lockup releasing command signal, so as to be an initial differential pressure which corresponds to the torque converter input torque when said lockup releasing command signal is detected; and differential pressure gradual reduction means for gradually reducing the differential pressure across the lockup clutch from said initial differential pressure to zero, for a predetermined duration from detection of said lockup releasing command signal.

2. The control system according to claim 1, wherein said input torque detecting means detects the torque converter input torque based on a throttle opening of an engine which is arranged on the input side of the torque converter.

3. The control system according to claim 1, wherein said initial differential pressure setting means sets the differential pressure across the lockup clutch upon detection of said lockup releasing command signal, so as to be an initial differential pressure immediately before the lockup clutch begins to slip.

4. The control system according to claim 1, wherein said differential pressure gradual reduction means gradually reduces the differential pressure across the lockup clutch from said initial differential pressure to zero, at a constant variation rate with time.

5. The control system according to claim 1, further comprising braking detecting means for detecting a braking condition of a vehicle, and a differential pressure instantaneous reduction means responsive to said braking detecting means, for stopping the operation of said differential pressure gradual reducing means and instantaneously reducing the differential pressure across the lockup clutch.

* * * * *